United States Patent
Kenagy et al.

(10) Patent No.: US 7,139,559 B2
(45) Date of Patent: Nov. 21, 2006

(54) SYSTEM AND METHOD FOR HANDSHAKING BETWEEN WIRELESS DEVICES AND SERVERS

(75) Inventors: Jason B. Kenagy, San Diego, CA (US); Robert D. Briggs, San Diego, CA (US); Gina Lombardi, San Diego, CA (US); Mark Staskauskas, San Diego, CA (US); Marc Stephen Phillips, San Diego, CA (US); Robert J. Miller, Redondo Beach, CA (US)

(73) Assignee: Qualcomm Inc., San Diego, CA (US)

( * ) Notice: Subject to any disclaimer, the term of this patent is extended or adjusted under 35 U.S.C. 154(b) by 440 days.

(21) Appl. No.: 10/315,800

(22) Filed: Dec. 9, 2002

(65) Prior Publication Data

US 2004/0110504 A1    Jun. 10, 2004

(51) Int. Cl.
*H04Q 7/20*    (2006.01)
(52) U.S. Cl. ...................... 455/418; 455/419
(58) Field of Classification Search ............... 455/418, 455/419, 550.1, 414.1, 414.4, 435.1, 420, 455/556.1; 709/203, 219; 713/1, 2, 168, 713/169, 175
See application file for complete search history.

(56) References Cited

U.S. PATENT DOCUMENTS

| | | | |
|---|---|---|---|
| 6,363,249 B1 * | 3/2002 | Nordeman et al. ......... 455/418 |
| 6,463,534 B1 * | 10/2002 | Geiger et al. ............... 713/168 |
| 2002/0032024 A1 | 3/2002 | Namba et al. .............. 455/419 |
| 2002/0068608 A1 | 6/2002 | Souissi ....................... 455/557 |
| 2002/0082048 A1 | 6/2002 | Toyoshima .................. 455/557 |
| 2002/0123334 A1 | 9/2002 | Borger et al. ............... 455/419 |
| 2002/0123336 A1 | 9/2002 | Kamada ...................... 455/420 |
| 2002/0197953 A1 | 12/2002 | Nagaoka et al. ........... 455/2.01 |
| 2004/0043763 A1 | 3/2004 | Minear et al. .............. 455/419 |

FOREIGN PATENT DOCUMENTS

WO    WO0214986    8/2001

* cited by examiner

*Primary Examiner*—Jean Gelin
(74) *Attorney, Agent, or Firm*—Philip R. Wadsworth; Robert J. O'Connell; Christopher S. Chow

(57) ABSTRACT

A system, method, and computer program for data communication, or "handshaking," between wireless devices and a server on a wireless network. Upon a wireless device communicating with the server, the server obtains data from the wireless device indicative of wireless device attributes, and the server determines access of the wireless device, based upon the wireless device attributes, to applications either resident on that server or on other computer devices on the wireless network.

46 Claims, 4 Drawing Sheets

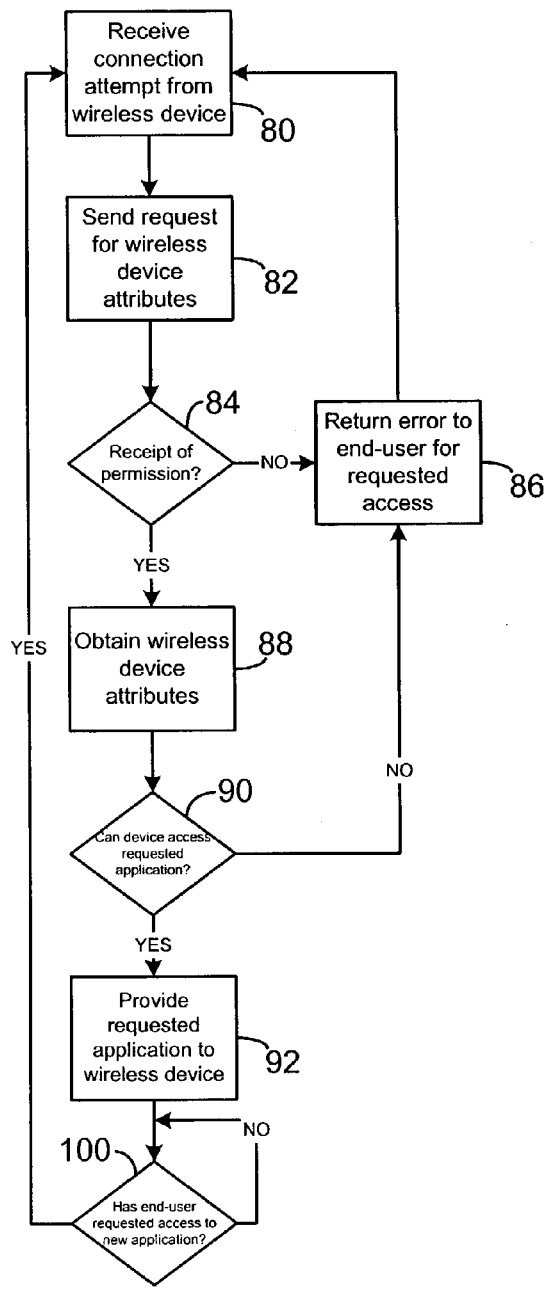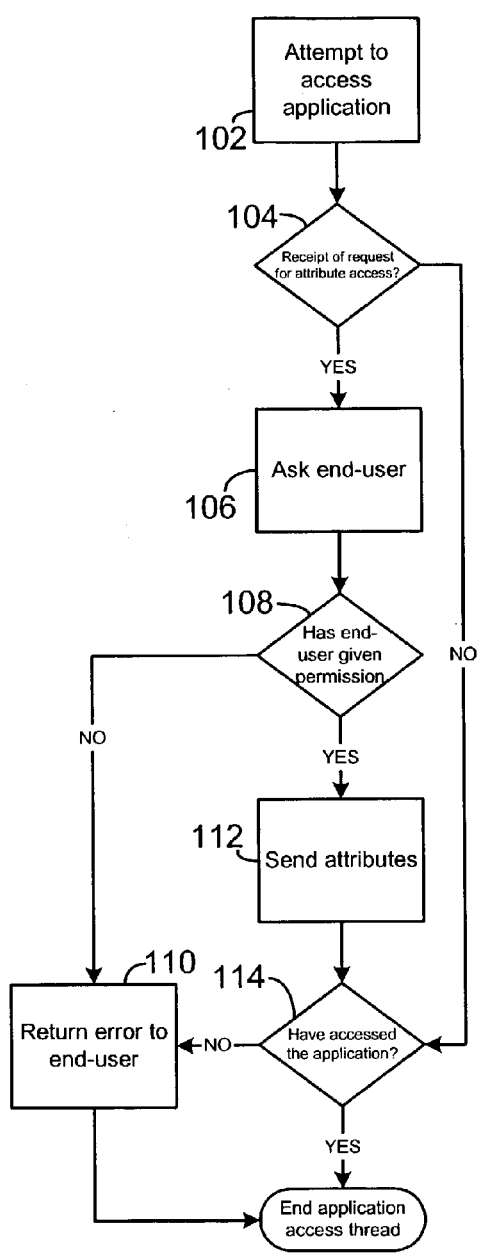
Fig. 5
Fig. 6

SYSTEM AND METHOD FOR HANDSHAKING BETWEEN WIRELESS DEVICES AND SERVERS

BACKGROUND OF THE INVENTION

I. Field of the Invention

The present invention generally relates to computer device networks and communications. More particularly, the invention relates to computer device interface protocols and data transfer upon bridging an initial communication connection, and during ongoing communication between computer devices on a wireless network.

II. Description of the Related Art

Wireless devices, such as cellular telephones, communicate packets including voice and data over a wireless network. In existing wireless networks, upon the initial contact between two computer devices on the wireless network, the devices will exchange a summary of information, which is called "handshaking." The handshaking process allows the computer devices to initially synchronize the data pathway and pass any relevant data necessary to maintain a satisfactory connection between the devices. Computer devices can also engage in handshaking activities after an initial contact has been bridged, while communication is ongoing, in order to maintain the satisfactory connection.

In an analog or digital wireless cellular network, there is an initial handshaking session between the cellular device and the base station. Typically, when the device is turned on, the mobile switch determines the identify of the device, such as through a mobile identification number (MIN), and what cell will carry any transmission from that device and assigns a vacant channel within that cell to take any voice or data transmission from the device. Rudimentary data may also be exchanged at the initial log in of the cellular device, such as device model identification. Ongoing data exchange also occurs in the cellular network, but typically to solely manage "handoffs," or motion of the device physically from cell to cell. The base station serving an ongoing communication sends a hand-off request to the mobile switch after the signal of the device drops below a handover threshold.

With complex devices, the data necessary for exchange at the time of initial device contact can be considerable in order to establish robust communication. Further, if increasingly complex activities are undertaken during the communication, such as data or application transfer, a significant handshaking communication at such time could disrupt or sever the existing communication connection. Accordingly, it is to an improved system of handshaking between computer devices across a wireless network that the present invention is primarily directed.

SUMMARY OF THE INVENTION

The present invention is a system, method, and computer program for data communication, or "handshaking," between wireless devices and a server, such as an application download server, on a wireless network. Upon the wireless device communicating with the application download server, the server obtains data from the wireless device indicative of wireless device attributes during the "handshaking session" and determines access to applications based upon the wireless device attributes. The applications can be resident on either that server or on another computer device on the wireless network.

The system of interfacing includes one or more wireless devices in selective communication with the wireless network with each wireless device has attributes thereof and a computer platform for selectively executing computer programs thereupon, and each wireless device further has an end-user who can selectively access the computer platform, and one or more application download servers in selective communication to the wireless network with each application download server having at least one resident application and selectively downloading applications to the wireless device(s). Once the wireless device initially communicates with the application download server across the wireless network, the application download server obtains data from the wireless device indicative of wireless device attributes to determine the access of the wireless device to applications resident on, or controlled by, the application download server, such as computer programs, graphics, menus and the like.

The method of communication between a wireless device and an application download server on a wireless network particularly includes the steps of communicating from the wireless device to a server across a wireless network, obtaining data from the wireless device indicative of wireless device attributes, and determining access of the wireless device to applications resident on, or controlled by, the application download server based upon the wireless device attributes. The step of obtaining the data from the wireless device can be receiving the wireless device attributes at the application download server where the application desired downloaded by the wireless device is resident. Further, the step of obtaining data from the wireless device can occur at the initial contact of the application download server by the wireless device, or at an application download attempt by the wireless device during an ongoing communication.

The present invention thus allows the data communication necessary between a complex wireless device and application download server to govern device access to applications available across the wireless network. Through the transmission of attribute data, such as hardware and software capabilities and subscriber identity, the risk of the device accessing unusable or inappropriate software is minimized. Further, if increasingly complex activities are undertaken during the communication between the wireless device and server, a further non-intrusive handshaking can occur to maintain access control without disrupting the extant connection.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

FIG. 5 is a flowchart of the process executing on an application download server receiving a communication attempt from a wireless device and acquiring wireless device attributes to determine application access.

FIG. 6 is a flowchart of the process executing on a wireless device attempting to contact an application download server and selectively providing wireless device attributes to the server.

DETAILED DESCRIPTION OF THE INVENTION

Figure 1:
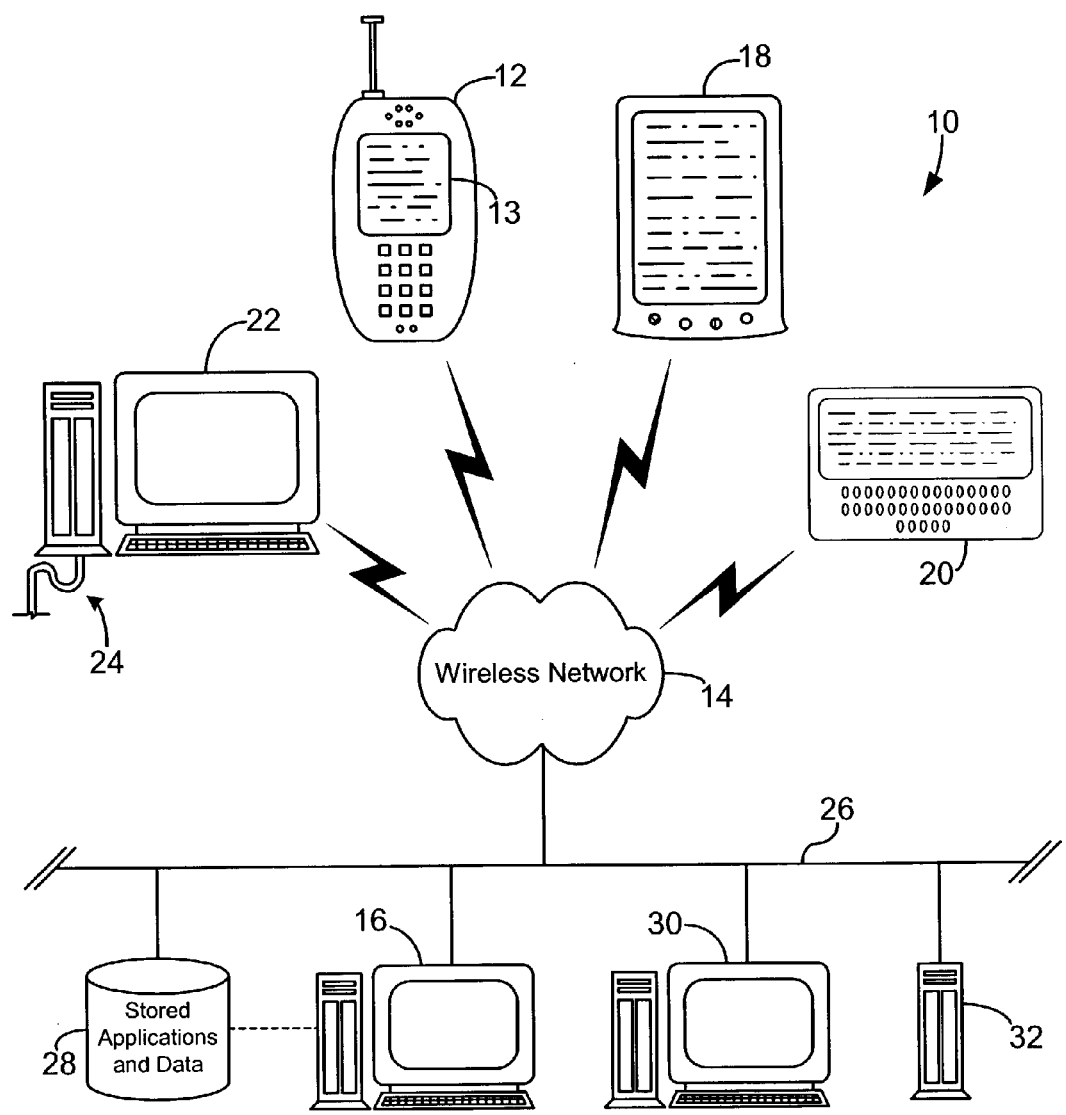
FIG. 1 is a representative diagram of a wireless network and the wireless devices that bridge communications to servers and other computer devices across the network.

With reference to the figures in which like numerals represent like elements throughout, FIG. 1 illustrates one embodiment of the present inventive system 10 for handshaking between one or more wireless devices, such as cellular telephone 12, in communication across a wireless network 14 with at least one application download server 16 that selectively downloads software applications or other data to the wireless devices across a wireless communication portal or other data access to the wireless network 14. As shown here, the wireless device can be a cellular telephone 12, with a graphics display 13, a personal digital assistant 18, a pager 20 with a graphics display, which is shown here as a two-way text pager, or even a separate computer platform 22 that has a wireless communication portal, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof. As used herein, the term "application" is intended to encompass executable and nonexecutable software files, raw data, aggregated data, patches, graphics, menus, and other code segments. The application or code segments can reside, run, and/or be utilized on the wireless device 12,18,20,22 as "client" software, or can be web-based or distributed applications instead of client-based applications.

In the system 10, one or more wireless devices 12,18,20,22 are in selective communication with the wireless network 14, each has and end-user thereof that typically controls the communication connection to the wireless network 14, and the end-user will attempt to download an application or data from an application download server 16 across the wireless network. The application download server 16 typically has at least one resident application, and selectively communicates with the one or more wireless devices 12,18,20,22 through the network (such as a cellular network shown in FIG. 2) and selectively downloads the applications thereto. The server 16 can also control access of the wireless devices 12,18,20,22 to applications resident on other data stores, such as database 28, second application download server 30, or stand-alone server 32. The system 10 facilitates the application download process through the application download server 16 obtaining data from the wireless device 12,18,20,22 indicative of wireless device attributes and then determining access of the wireless device to applications accessible through the application download server 16 based upon those wireless device attributes. The handshaking can convey device attributes at initial contact, or upon the wireless device 12,18,20,22 attempting to access an application during an ongoing communication.

The system 10 therefore addresses the desire for end-users to be able to run applications on their wireless devices, such as 3G mobile phones, other than the applications that the phones are manufactured with. The system 10 filters the available applications to the wireless device 12,18,20,22 to occur transparently, i.e. without end-user knowledge/awareness. For example, a wireless device 12,18,20,22 can be manufactured with an address book that is not very user friendly and/or does not synchronize with the address book that the person uses on a separate personal computer. The end-user consequently would desire to download another address book that is more user-friendly, and that has the synchronization capabilities desired. Other examples of programs are games, mapping applications (position location applications), and "Bluetooth" remote controls. As the end-user can be charged for airtime to download an application, the end-user desires a method of determining prior to application download whether that application will actually run on that end-users wireless device 12,18,20,22. Without a method of such determination prior to application download, the end-user might pay for airtime to download an unusable application. Furthermore, if the end-user cannot ascertain why an application will not run, the end-user can become frustrated, which will generate customer service calls. Thus, when the end-user attempts to download an application over a data interface, handshaking is used to determine the capabilities of the wireless device prior to allowing an actual download to occur. If, and only if, the handshaking yields that the wireless device 12,18,20,22 supports all the needs of the application will the application be downloaded. Moreover, other results can occur instead of a refusal to download, such as multiple levels of results, e.g. "not possible," "possible," "not recommended," and "additional recommendations."

The one or more application download servers 16, such as application download server 16, that provide the applications to the wireless devices 12,18,20,22 are shown here on a local server-side network 26 with other computer elements in communication with the wireless network 14. A stored application database 28 can contain software applications and data that are accessible and downloadable to be executable on the wireless devices 12,18,20,22, either directly or through application download server 16. There is also shown a stand-alone server 32, a second application download server 30 which can provide applications, along with other functionality, to the wireless devices 12,18,20,22. All of the components can work in tandem to provide application access as is further herein described. However, it should be noted that all server-side functions can also be performed on one server, such as application download server 16. Further, any computer or server-side computer platform can provide separate services and processes to the wireless devices 12,18,20,22 across the wireless network 14.

Figure 2:
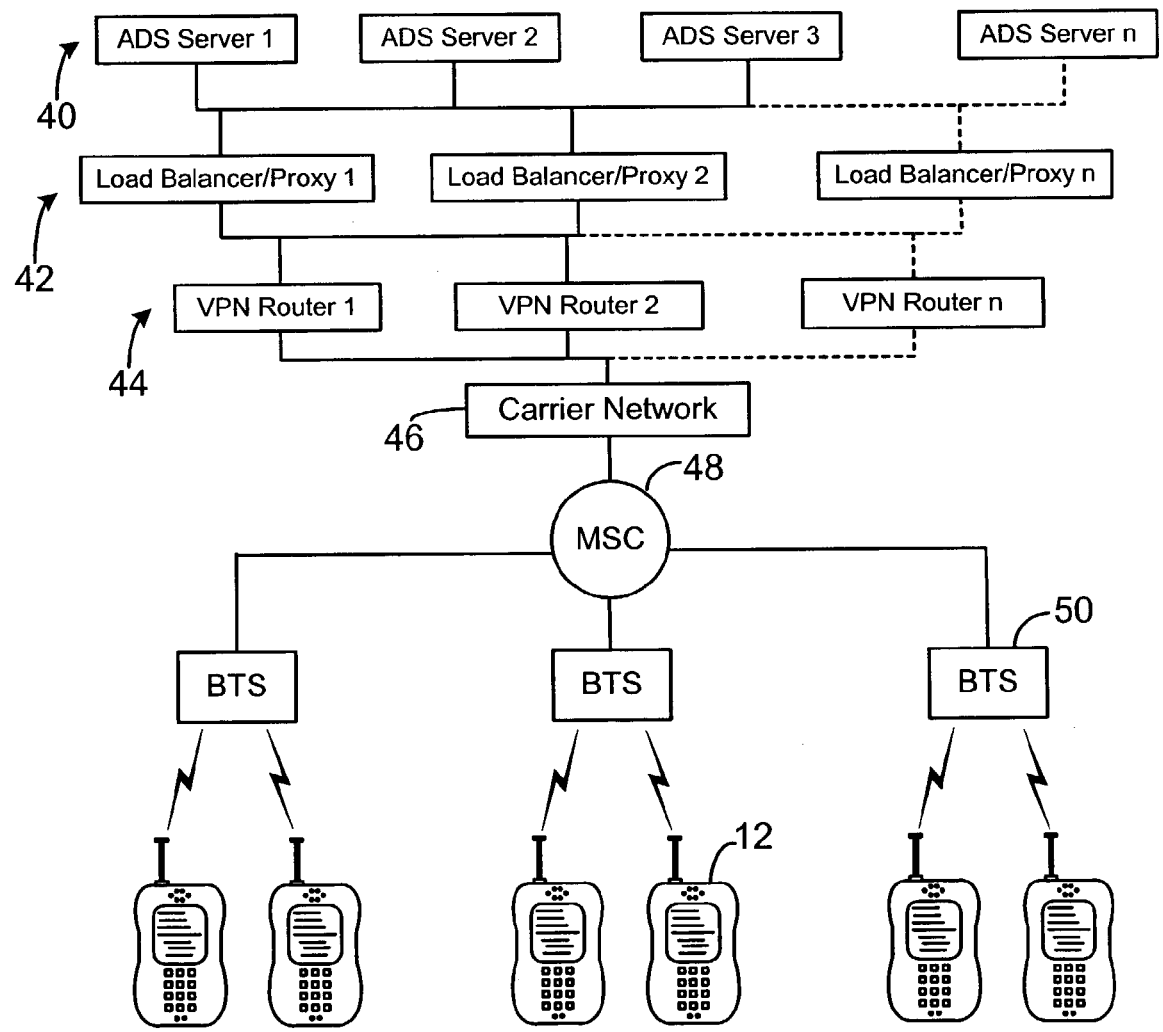
FIG. 2 is a block diagram of the hardware components of the wireless network providing communication between different wireless devices and application download servers across a cellular telecommunication network.

FIG. 2 is a block diagram that more fully illustrates the components of the wireless network 14 and interrelation of the elements of the system 10 on a cellular telecommunications network. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. A series of application download servers 40 (which are further described below) are in communication with a series of load balancing servers 42 to assist in managing data flow to the server series 42. The load balancing servers 42 are in communication with a series of routers 44 that ultimately connect to the carrier network 46, which can be virtual private network (VPN) routers. Other server-side components will be present on the cellular data network with any other components that are needed to provide cellular telecommunication services. The server-side support is therefore readily scalable through the increase of components.

The routers 44 communicate with a carrier network 46 through a data link, such as the Internet, a secure LAN, WAN, or other network. The carrier network 46 controls messages (generally in the form of data packets) sent to a messaging service controller ("MSC") 48. The carrier network 46 communicates with the MSC 48 by a network, the Internet and/or POTS ("plain ordinary telephone system"). Typically, the network or Internet connection between the carrier network 46 and the MSC 48 transfers data, and the POTS transfers voice information. The MSC 48 is connected to multiple base stations ("BTS") 50. In a similar manner to the carrier network, the MSC 48 is typically connected to the BTS 50 by both the network and/or Internet for data transfer and POTS for voice information. The BTS 50 ultimately broadcasts messages wirelessly to the wireless devices, such as cellular telephone 12, by short messaging service ("SMS"), or other over-the-air methods known in the art.

Figure 3:
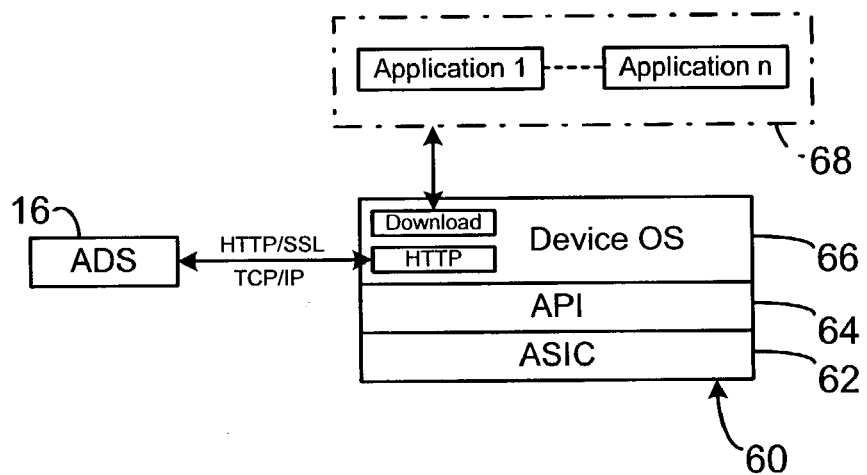
FIG. 3 is a block diagram of a wireless device computer platform interacting with an application download server, and executing one or more applications on the wireless device platform.

With reference to FIG. 3, there is shown a block diagram of wireless device computer platform 60 that can receive and execute one or more software applications in an application layer 68, wherein the applications are transmitted from the application download server 16. The computer platform 60 includes, among other components, an application-specific integrated circuit ("ASIC") 62, or other processor, microprocessor, logic circuit, programmable gate array, or other data processing device. The ASIC 62 is installed at the time of manufacture of the wireless device and is not normally upgradeable. The ASIC 62 or other processor executes an application programming interface ("API") layer 64 that interfaces with the device operating layer 66 that supports the execution of any resident programs in the memory of the wireless device 12,18,20,22. The memory can be comprised of read-only or random-access memory (RAM and ROM), EPROM, EEPROM, flash cards, or any memory common to computer platforms. The computer platform 60 also is in communication with a local database that can hold the software applications not actively used in memory, such as the software applications downloaded from the application download server 16. The local database is typically comprised of one or more flash memory cells, but can be any secondary or tertiary storage device as known in the art, such as magnetic media, EPROM, EEPROM, optical media, tape, or soft or hard disk. The OS layer 66 is embodied as interfacing with the application download server 16 through a HTTP/SSL and TCP/IP exchange that will occur through the carrier network 46.

Figure 4:
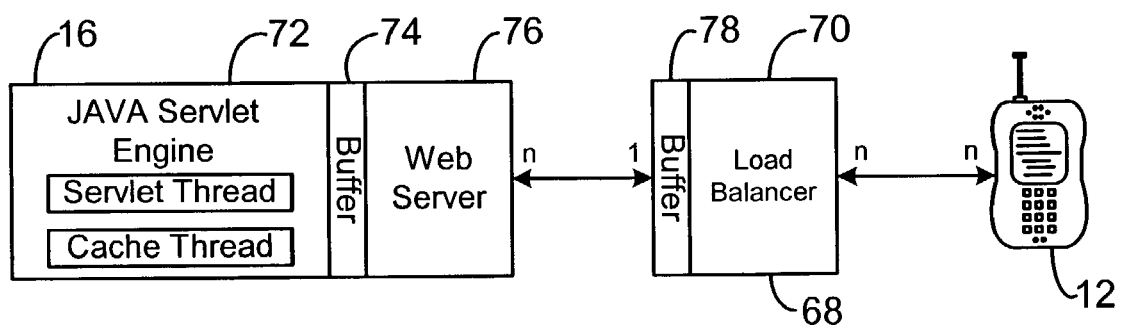
FIG. 4 is a block diagram of an application download server communicating with a wireless device via a load-balancing server.

FIG. 4 illustrates one embodiment of the data interface wherein the application download server 16 is a "thin" server interacting with one a load balancing interfacing server 68. The load balancing server ultimately supports the communication connection with the wireless devices, such as cellular telephone 12. It should be noted that while the application download server 16 is shown in an IP connection running over a CDMA, the system 10 can support different connections running over different wireless interfaces, such as those based upon Bluetooth protocols. The application download server 16 includes a JAVA servlet engine that includes both active servlet threads as well as cached program threads, and the JAVA engine, through a buffer 74, interfaces with a web server 76. It can thus be seen that separate computer devices can comprise the application download server 16 if desired. The web server 76 interfaces with the load balancer 68 through a buffer 78 and the load balancing system 70, which can also be separate computer devices. The load balancer ultimately interfaces with the wireless devices 12,18,20,22 so as to distribute the data load in the most efficient manner to the application download server series (40 in FIG. 2).

In operation, when an application is selected to be downloaded either through an initial handshake or a handshake at the time of the download attempt between the wireless device 12,18,20,22 and application download server 16, in which information concerning the needs of the application are compared with the available capabilities of the wireless device. In one embodiment, the application download server 16 contains an information file that states the requirements of the application, such as features or classes required by the application. For instance, a mapping application may require access to the classes of position and location for querying the device for its current latitude and longitude, display parameters for drawing bitmaps on the display of the device, menu capabilities for creating pull-down menus, end-user input capabilities, and networking capabilities such as TCP/IP connections. Another example of an attribute is access to third party libraries. In the mapping application example, access to a third party library of maps can be necessary in order to properly use the mapping program. The information file can also contain the specific file system and RAM storage needs as well. For instance, a particular information file might state that an application is 100K in size, and thus the wireless device must have 100K of file system space to store the download and 100K of RAM to load the application into at runtime. The information file can also contain other hardware needs, such as the number of colors needing on the display, screen dimensions, processor speed, or any other criteria that can impact successful application download and execution.

In one embodiment, the handshake has the contents of the information file transmitted from the application download server 16 to the wireless device 12,18,20,22. In such embodiment the wireless device determines whether or not it supports all the requirements outlined in the information file. If the wireless device 12,18,20,22 would allow support of these features of the application, then the download of the application commences after the handshake. Otherwise, if the required features are not all supported, the display of a message indicating to the end-user that the application cannot be downloaded because the wireless device does not meet a particular requirement. Such a message can be generated autonomously by the wireless device 12,18,20,22 or the message can be retrieved from a server, such as second server 32, or another server on the wireless network 14. If embodied wherein such an error message is sent from a server 16,30,32, the network carrier can customize the messages for customer care purposes.

It should also be noted that extra steps can occur on the wireless device 12,18,20,22 to remedy the reason that the application cannot be downloaded. For example, if the only reason for download failure is that certain software classes or libraries are not resident on the wireless device platform 60 necessary to support the application, then the wireless device 12,18,20,22 can attempt to download those classes or libraries rather than immediately issuing a message that the download failed. If the download of those classes/libraries succeed, then the application can subsequently be downloaded.

In another embodiment, rather than the information file being transmitted from the application download server 16 to the wireless device 12,18,20,22, the wireless device transmits to the application download server 16 that wireless device's attributes. As an example, the wireless device transmits to the application download server that it has 400K of RAM available, 1 MB of flash available, a 60×75 screen with 8 bit color display, and that it has the Network Class—the Bluetooth class. In such a case, the application is downloaded only if the application download server 16 determines that the wireless device 12,18,20,22 supports everything that the application requires. Otherwise, the application download server 16 can return an error to the wireless device regarding the attempted download.

FIG. 5 is a flowchart illustrating one embodiment of the process executing on the application download server 16 interfacing with a wireless device, such as cellular telephone 12. The application download server 16 receives a connection attempt from the wireless device 12,18,20,22, as shown at step 80 and the sends a request to the wireless device to obtain the wireless device attributes, at shown at step 82. In this embodiment, the application download server 16 then determines whether it has received permission from the end-user of the wireless device 12,18,20,22 to obtain the attributes, as shown at decision 84, and if not, an error is returned to the end-user to deny the requested access, as shown at step 86, and then the process returns to await a connection attempt at step 80. If the end-user of the wireless device 12,18,20,22 did grant permission to access the wireless device attributes at decision 84, the wireless device attributes are obtained from the wireless device, as shown by step 90, which can occur through file exchange between the application download server 16 and wireless device 12,18, 20,22 as described above. It should be noted that decision 84 is only a safeguard against unwanted wireless device access by the application download server 16 and is not necessary to implement the system 10.

Once the wireless device attributes are obtained, a determination is made as to whether the wireless device can access the requested application, as shown at decision 90. If the wireless device cannot access the application for some reason, such as inadequate hardware or software capability, then an error is returned to the end-user as shown at step 86 and the process otherwise return to await a further connection attempt from a wireless device at step 80. If the wireless device 12,18,20,22 is able to download the application, then the requested application is provided to the wireless device as shown at step 92 and then a determination is made as to whether the end-user has requested access to a new application, as shown at decision 100. If the end-user has not requested a new application, the process enters a wait state at decision 100 relative to the specific thread of interaction with the wireless device. Otherwise, if the end-user has requested another application, the process iterates to step 80 and treats the request like a new connection attempt.

FIG. 6 illustrates the parallel process occurring at a wireless device 12,18,20,22 that is interacting with the application download server 16 in FIG. 5. The wireless device attempts to access an application, as shown at step 102, and connects with whatever server on the wireless network 14 represents that it provides access to the requested application. The wireless device then makes a determination as to whether the application download server 16 has sent a request to access wireless device attributes, as shown at decision 104. If there has not been a request sent, then the wireless device assumes that a comparison is not needed and awaits access to the application, at decision 114. If permission to access wireless device attributes has been requested at decision 104, then end-user is asked for permission as shown at step 106, and then a determination is made as to whether the end-user has given permission for attribute access, as shown at decision 108.

If the end-user has not given permission for attribute access at decision 108, then an error is returned to the end-user indicating the inability to access the requested application, as shown at step 110, and the process execution thread terminates. Otherwise, if the end-user has given permission to access the attributes, the attributes are sent to the application download server 16, as shown at step 112. Step 112 is only one embodiment of the process, and the wireless device 12,18,20,22 does not have to send its attributes, via file or other data, to the application download server 16, but can simply provide access to the attributes to an agent of the server, make the attributes searchable, or through any other data gathering method known in the art. After the attributes have been sent at step 112, a determination is made as to whether the wireless device has accessed the requested application, as shown at decision 114, and if not, an error is returned to the end-user at step 110, and the application access thread terminates. Otherwise, if the access has been granted at decision 114, then the process thread simply terminates on the wireless device 12,18,20,22. The process will begin again at step 102 upon the end-user desiring to access another application across the network.

The system 10 accordingly provides a method of communication between a wireless device 12,18,20,22 and an application download server 16 on a wireless network 14 including the steps of communicating from a wireless device 12,18,20,22 to an application download server 16 across a wireless network 14, wherein the wireless device having attributes thereof and a computer platform 60 for selectively executing computer programs thereupon, and the wireless device further having an end-user who can selectively access the computer platform 60, and the application download server 16 having at least one downloadable application resident thereupon. The method further includes the step of obtaining data from the wireless device 12,18,20,22 indicative of wireless device attributes, and then determining access of the wireless device 12,18,20,22 to applications accessible through the application download server 16 based upon the wireless device attributes. The step of obtaining data from the wireless device 12,18,20,22 can be obtaining attributes of the wireless device that include data relative to the computer platform 60 and/or software resident on the wireless device computer platform 60.

The step of obtaining the data from the wireless device 12,18,20,22 can be receiving the wireless device attributes at the application download server 16 where the application desired downloaded by the wireless device 12,18,20,22 is resident. The step of obtaining data from the wireless device 12,18,20,22 can occur at the initial contact of the application download server 16 by the wireless device, or alternately, can occur at an application download attempt by the wireless device. The method can also further include the steps of, at the application download attempt, prompting the end-user of the wireless device 12,18,20,22 to request access to wireless device attributes, and upon grant of end-user permission, transmitting wireless device attributes to the application download server 16.

If the system 10 is so embodied, the method can further include the steps of transmitting the requirements for a requested application to be downloaded to the wireless device 12,18,20,22, and indicating if the download is possible based upon the requirements received. Alternately, the method can include the step of transmitting the requirements for a requested application to be downloaded to the wireless device 12,18,20,22 can be transmitting the requirements from the application download server 16 where the application is resident, and then the step of indicating if the download is possible is transmitting data from the wireless device 12,18,20,22 to the application download server 16 to indicate if the download is possible.

Upon failure of a download by the wireless device 12,18, 20,22, the method can include the step of notifying the end-user of the download failure.

In view of the method being executable on the computer platform of a wireless device 12,18,20,22, the present invention includes a program resident in a computer readable medium, where the program directs a server or other computer device having a computer platform to perform the steps of the method. The computer readable medium can be the memory of the application download server 16, or can be in a connective database, such as database 28. Further, the computer readable medium can be in a secondary storage media that is loadable onto a wireless device computer platform, such as a magnetic disk or tape, optical disk, hard disk, flash memory, or other storage media as is known in the art.

In the context of FIGS. 5 and 6, the method may be implemented, for example, by operating portion(s) of the wireless network 14 to execute a sequence of machine-readable instructions, such as wireless device computer platform 60, the application download server 16, and stand-alone server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A wireless device, comprising:
a wireless communications interface for providing communication between said wireless device and a server over a wireless network; and
a computer platform, coupled to said wireless communications interface, and for controlling said wireless communications interface, said computer platform also for maintaining an application runtime environment for downloaded applications, said computer platform comprising a data processing circuit supporting an operating system and a first set of attributes;
wherein
said first set of attributes describes said application runtime environment;
said operating system includes a first logic to cause said computer platform to perform a comparison between said first set of attributes against a second set of attributes received from said wireless communications interface in response to an application download request for an application made by the wireless device to the server,
said second set of attributes describes a required runtime environment associated with the application, and
said operating system includes a second logic to cause said computer platform to perform a block of a download of the application from the server to the wireless device if the comparison indicates that the application would not be compatible with said application runtime environment, and to cause said computer platform to download the application if the comparison indicates that the application would be compatible with said application runtime environment.

2. The wireless device of claim 1, wherein said second set of attributes is received by said wireless device as part of a file transmitted from the server to said wireless device.

3. The wireless device of claim 1, wherein said block is performed by preventing an initiation of a download of the application, and displaying an associated error message on said wireless device.

4. The wireless device of claim 1, wherein said first set of attributes comprises:
at least one attribute corresponding to a set of classes available in said application runtime environment.

5. The wireless device of claim 1, wherein said first set of attributes comprises:
at least one attribute corresponding to a list of libraries available in said application runtime environment.

6. The wireless device of claim 1, wherein said first set of attributes comprises:
at least one attribute corresponding to a list of libraries accessible to said application runtime environment.

7. The wireless device of claim 1, wherein said first set of attributes comprise:
an attribute identifying a quantity of available storage capacity of said application runtime environment.

8. The wireless device of claim 7, wherein said quantity of available storage is a quantity of available storage in a random access memory portion of said storage.

9. The wireless device of claim 7, wherein said quantity of available storage is a quantity of available storage in a file system portion of said storage.

10. The wireless device of claim 1, wherein said second set of attributes comprises:
at least one attribute corresponding to a set of classes required to support execution of the application.

11. The wireless device of claim 1, wherein said second set of attributes comprises:
at least one attribute corresponding to a list of libraries required to support execution of the application.

12. The wireless device of claim 1, wherein said second set of attributes comprises:
at least one attribute corresponding to a list of third party libraries required to support execution of the application.

13. The wireless device of claim 1, wherein said second set of attributes comprises:
an attribute identifying a quantity of available storage capacity required to support execution of the application.

14. The wireless device of claim 13, wherein said quantity of available storage is a quantity of available storage in a random access memory portion of said storage.

15. The wireless device of claim 13, wherein said quantity of available storage is a quantity of available storage in a file system portion of said storage.

16. The wireless device of claim 4, wherein said set of classes available in said application runtime environment comprise classes of position and location operable in querying the wireless device for a latitude and a longitude.

17. The wireless device of claim 1, further comprising a display mechanism operable by the computer platform and having a display mechanism characteristic available in said application runtime environment, wherein said first set of attributes comprises at least one attribute corresponding to the display mechanism characteristic.

18. The wireless device of claim 1, wherein at least one of said first set of attributes and said second set of attributes comprises at least one attribute corresponding to a network connection characteristic.

19. The wireless device of claim 1, wherein at least one of said first set of attributes and said second set of attributes comprises at least one attribute corresponding to a processor speed characteristic.

20. The wireless device of claim 1, wherein at least one of said first set of attributes and said second set of attributes comprises at least one attribute corresponding to an end-user input mechanism characteristic.

21. The wireless device of claim 1, wherein at least one of said first set of attributes and said second set of attributes comprises at least one attribute corresponding to an application execution-related characteristic.

22. The wireless device of claim 1, wherein at least one of said first set of attributes and said second set of attributes comprises a plurality of attributes corresponding to a plurality of application execution-related characteristics.

23. The wireless device of claim 1, wherein at least one of said first set of attributes and said second set of attributes comprises at least one attribute corresponding to a menu creation characteristic.

24. A method operable on a wireless device to manage download requests for an application stored on a server over a wireless network, comprising:
    sending a request to the server for a download of an application;
    receiving a second set of attributes describing a required runtime environment associated with the application;
    comparing said second set of attributes to a first set of attributes describing an application runtime environment supported by said wireless device to determine whether the application is compatible with said application runtime environment;
    blocking a download of the application if said comparing indicates that the application is not compatible with said application runtime environment; and
    downloading the application if said comparing indicates that the application is compatible with said application runtime environment.

25. The method of claim 24, wherein said second set of attributes is received in a file transmitted by the server.

26. The method of claim 24, wherein said step of blocking comprises:
    preventing an initiation of a download of the application from the server; and
    displaying and error message on said wireless device.

27. The method of claim 24, wherein said first set of attributes comprises:
    at least one attribute corresponding to a set of classes available in said runtime environment.

28. The method of claim 24, wherein said first set of attributes comprises:
    at least one attribute corresponding to a list of libraries available in said runtime environment.

29. The method of claim 24, wherein said first set of attributes comprises:
    at least one attribute corresponding to a list of libraries accessible to said runtime environment.

30. The method of claim 24, wherein said first set of attributes comprise:
    an attribute identifying a quantity of available storage capacity of said application runtime environment.

31. The method of claim 30, wherein said quantity of available storage is a quantity of available storage in a random access memory portion of said storage.

32. The method of claim 30, wherein said quantity of available storage is a quantity of available storage in a file system portion of said storage.

33. The method of claim 24, wherein said second set of attributes comprises:
    at least one attribute corresponding to a set of classes required to support execution of the application.

34. The method of claim 24, wherein said second set of attributes comprises:
    at least one attribute corresponding to a list of libraries required to support execution of the application.

35. The method of claim 24, wherein said second set of attributes comprises:
    at least one attribute corresponding to a list of third party libraries required to support execution of the application.

36. The method of claim 24, wherein said second set of attributes comprises:
    an attribute identifying a quantity of available storage capacity required to support execution of the application.

37. The method of claim 36, wherein said quantity of available storage is a quantity of available storage in a random access memory portion of said storage.

38. The method of claim 36, wherein said quantity of available storage is a quantity of available storage in a file system portion of said storage.

39. The method of claim 27, wherein said set of classes available in said application runtime environment comprise classes of position and location operable in querying the wireless device for a latitude and a longitude.

40. The method of claim 24, wherein at least one of said first set of attributes and said second set of attributes comprises at least one attribute corresponding to a display mechanism characteristic.

41. The method of claim 24, wherein at least one of said first set of attributes and said second set of attributes comprises at least one attribute corresponding to a network connection characteristic.

42. The method of claim 24, wherein at least one of said first set of attributes and said second set of attributes comprises at least one attribute corresponding to a processor speed characteristic.

43. The method of claim 24, wherein at least one of said first set of attributes and said second set of attributes comprises at least one attribute corresponding to an end-user input mechanism characteristic.

44. The method of claim 24, wherein at least one of said first set of attributes and said second set of attributes comprises at least one attribute corresponding to an application execution-related characteristic.

45. The method of claim 24, wherein at least one of said first set of attributes and said second set of attributes comprises a plurality of attributes corresponding to a plurality of application execution-related characteristics.

46. The method of claim 24, wherein at least one of said first set of attributes and said second set of attributes comprises at least one attribute corresponding to a menu creation characteristic.

* * * * *

(12) EX PARTE REEXAMINATION CERTIFICATE (7012th)
United States Patent
Kenagy et al.

(10) Number: US 7,139,559 C1
(45) Certificate Issued: Aug. 18, 2009

(54) SYSTEM AND METHOD FOR HANDSHAKING BETWEEN WIRELESS DEVICES AND SERVERS

(75) Inventors: Jason B. Kenagy, San Diego, CA (US); Robert D. Briggs, San Diego, CA (US); Gina Lombardi, San Diego, CA (US); Mark Staskauskas, San Diego, CA (US); Marc Stephen Phillips, San Diego, CA (US); Robert J. Miller, Redondo Beach, CA (US)

(73) Assignee: Qualcomm Incorporated, San Diego, CA (US)

Reexamination Request:
No. 90/008,805, Aug. 15, 2007

Reexamination Certificate for:
Patent No.: 7,139,559
Issued: Nov. 21, 2006
Appl. No.: 10/315,800
Filed: Dec. 9, 2002

(51) Int. Cl.
*H04Q 7/20* (2006.01)

(52) U.S. Cl. ........................ 455/418; 455/419
(58) Field of Classification Search ............... None
See application file for complete search history.

(56) References Cited

U.S. PATENT DOCUMENTS

| | | |
|---|---|---|
| 5,594,779 A | 1/1997 | Goodman |
| 5,732,216 A | 3/1998 | Logan et al. |
| 5,738,583 A | 4/1998 | Comas et al. |
| 5,809,415 A | 9/1998 | Rossmann |
| 5,822,324 A | 10/1998 | Kostreti et al. |
| 5,852,775 A | 12/1998 | Hidary |
| 5,867,781 A | 2/1999 | Hofmann |
| 5,924,026 A | 7/1999 | Krishnan |
| 5,937,347 A | 8/1999 | Gordon |
| 5,966,663 A | 10/1999 | Gleason |
| 6,006,091 A | 12/1999 | Lupien |
| 6,018,710 A | 1/2000 | Wynblatt et al. |
| 6,029,065 A | 2/2000 | Shah |
| 6,032,039 A | 2/2000 | Kaplan |
| 6,035,339 A | 3/2000 | Agraharam et al. |
| 6,047,051 A | 4/2000 | Ginzboorg et al. |
| 6,072,946 A | 6/2000 | Dooley et al. |
| 6,097,962 A | 8/2000 | Corriveau et al. |
| 6,098,102 A | 8/2000 | Nielsen et al. |
| 6,104,924 A | 8/2000 | Shirai |

(Continued)

FOREIGN PATENT DOCUMENTS

| | | |
|---|---|---|
| CA | 2267549 | 9/2000 |
| CA | 2199757 | 5/2003 |
| CL | 1301-1993 | 1/1995 |
| CL | 1621-1997 | 7/1998 |
| CL | 1437-1999 | 12/1999 |

(Continued)

OTHER PUBLICATIONS

3GPP TS 23.057 V4.0.0 (Dec. 2000), "3rd Generation Partnership Project; Technical Specification Group Terminals; Mobile Station Application Execution Environment (MExE);Functional Description; Stage 2," (Release 4).

Sun Microsystems, Mobile Information Device Profile (JSR–37), JCP Specification, Java 2 Platform, Micro Edition, 1.0, Sep. 1, 2000.

(Continued)

*Primary Examiner*—Mary Steelman

(57) ABSTRACT

A system, method, and computer program for data communication, or "handshaking," between wireless devices and a server on a wireless network. Upon a wireless device communicating with the server, the server obtains data from the wireless device indicative of wireless device attributes, and the server determines access of the wireless device, based upon the wireless device attributes, to applications either resident on that server or on other computer devices on the wireless network.

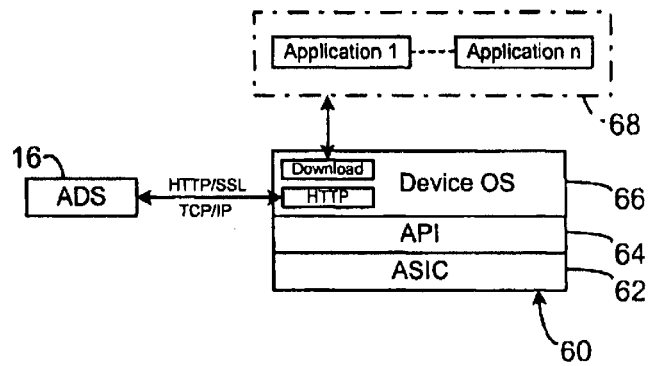

U.S. PATENT DOCUMENTS

| | | | |
|---|---|---|---|
| 6,167,253 | A | 12/2000 | Farris et al. |
| 6,167,255 | A | 12/2000 | Kennedy, III et al. |
| 6,167,441 | A | 12/2000 | Himmel |
| 6,185,682 | B1 | 2/2001 | Tang |
| 6,223,028 | B1 | 4/2001 | Chang et al. |
| 6,263,497 | B1 | 7/2001 | Maeda et al. |
| 6,275,692 | B1 | 8/2001 | Skog |
| 6,282,435 | B1 | 8/2001 | Wagner et al. |
| 6,311,056 | B1 | 10/2001 | Sandidge |
| 6,336,101 | B1 | 1/2002 | Dean et al. |
| 6,356,543 | B2 | 3/2002 | Hall et al. |
| 6,360,077 | B2 | 3/2002 | Mizoguchi |
| 6,366,947 | B1 | 4/2002 | Kavner |
| 6,378,069 | B1 | 4/2002 | Sandler et al. |
| 6,401,113 | B2 | 6/2002 | Lazaridis et al. |
| 6,405,037 | B1 | 6/2002 | Rossmann |
| 6,405,309 | B1 | 6/2002 | Cheng et al. |
| 6,430,409 | B1 | 8/2002 | Rossmann |
| 6,438,585 | B2 | 8/2002 | Mousseau et al. |
| 6,463,463 | B1 | 10/2002 | Godfrey et al. |
| 6,463,464 | B1 | 10/2002 | Lazaridis et al. |
| 6,473,609 | B1 | 10/2002 | Schwartz et al. |
| 6,477,150 | B1 | 11/2002 | Maggenti et al. |
| 6,477,565 | B1 | 11/2002 | Daswani et al. |
| 6,493,751 | B1 | 12/2002 | Tate et al. |
| 6,507,727 | B1 | 1/2003 | Henrick |
| 6,542,740 | B1 | 4/2003 | Olgaard et al. |
| 6,546,002 | B1 | 4/2003 | Kim |
| 6,567,854 | B1 | 5/2003 | Olshansky et al. |
| 6,571,281 | B1 | 5/2003 | Nickerson |
| 6,580,914 | B1 | 6/2003 | Smith |
| 6,587,127 | B1 | 7/2003 | Leeke et al. |
| 6,587,684 | B1 | 7/2003 | Hsu et al. |
| 6,591,288 | B1 | 7/2003 | Edwards et al. |
| 6,603,844 | B1 | 8/2003 | Chavez, Jr. et al. |
| 6,625,578 | B2 | 9/2003 | Spaur et al. |
| 6,650,901 | B1 | 11/2003 | Schuster et al. |
| 6,687,901 | B1 | 2/2004 | Imamatsu |
| 6,790,142 | B2 | 9/2004 | Okada et al. |
| 6,795,704 | B1 | 9/2004 | Hardin |
| 6,807,415 | B2 | 10/2004 | Sato |
| 6,816,895 | B2 | 11/2004 | Andreakis et al. |
| 6,862,445 | B1 | 3/2005 | Cohen |
| 6,874,029 | B2 | 3/2005 | Hutcheson et al. |
| 6,947,705 | B2 | 9/2005 | Tsuchiuchi |
| 6,947,772 | B2 | 9/2005 | Minear et al. |
| 6,955,298 | B2 | 10/2005 | Herle |
| 6,957,076 | B2 | 10/2005 | Hunzinger |
| 6,996,394 | B2 | 2/2006 | Minear et al. |
| 7,003,575 | B2 | 2/2006 | Ikonen |
| 7,008,317 | B2 | 3/2006 | Cote et al. |
| 7,027,801 | B1 | 4/2006 | Hall et al. |
| 7,039,398 | B2 | 5/2006 | Chmaytelli et al. |
| 7,062,543 | B2 | 6/2006 | Kishimoto |
| 7,065,342 | B1 | 6/2006 | Rolf |
| 7,103,048 | B1 | 9/2006 | Nozawa |
| 7,103,368 | B2 | 9/2006 | Teshima |
| 7,139,551 | B2 | 11/2006 | Jamadagni |
| 7,139,559 | B2 | 11/2006 | Kenagy et al. |
| 7,200,142 | B1 | 4/2007 | Loghmani |
| 7,218,918 | B1 | 5/2007 | Alston |
| 7,248,861 | B2 | 7/2007 | Lazaridis et al. |
| 7,251,476 | B2 | 7/2007 | Cortegiano |
| 7,292,870 | B2 | 11/2007 | Heredia et al. |
| 7,370,095 | B2 | 5/2008 | Sauvage et al. |
| 2002/0002605 | A1 | 1/2002 | Honda |
| 2002/0016817 | A1 | 2/2002 | Offer |
| 2002/0019831 | A1 | 2/2002 | Wade |
| 2002/0032019 | A1 | 3/2002 | Marks et al. |
| 2002/0072355 | A1 | 6/2002 | Jeong et al. |
| 2002/0090985 | A1 | 7/2002 | Tochner et al. |
| 2002/0095456 | A1 | 7/2002 | Wensheng |
| 2002/0115449 | A1 | 8/2002 | Allen |
| 2002/0128029 | A1 | 9/2002 | Nishikawa et al. |
| 2002/0131404 | A1 | 9/2002 | Mehta et al. |
| 2002/0160752 | A1 | 10/2002 | Hook et al. |
| 2002/0161637 | A1 | 10/2002 | Sugaya |
| 2003/0017826 | A1 | 1/2003 | Fishman et al. |
| 2003/0041125 | A1 | 2/2003 | Salomon |
| 2003/0065802 | A1 | 4/2003 | Vikikainen et al. |
| 2003/0143991 | A1 | 7/2003 | Minear |
| 2003/0163369 | A1 | 8/2003 | Arr |
| 2003/0189913 | A1 | 10/2003 | Kim |
| 2004/0002943 | A1 | 1/2004 | Merrill et al. |
| 2004/0203681 | A1 | 10/2004 | Ross |
| 2006/0141993 | A1 | 6/2006 | Minear et al. |
| 2006/0287040 | A1 | 12/2006 | Walker et al. |
| 2007/0060117 | A1 | 3/2007 | Fishman et al. |

FOREIGN PATENT DOCUMENTS

| | | |
|---|---|---|
| CL | 1787-2001 | 7/2002 |
| EP | 1128691 | 8/2001 |
| EP | 1168758 | 1/2002 |
| GB | 2346716 | 8/2000 |
| GB | 2369701 | 6/2002 |
| JP | 11-187470 | 7/1999 |
| JP | 2001-306923 | 11/2001 |
| JP | 2002-014890 | 1/2002 |
| KR | 2001-0106325 | 11/2001 |
| KR | 2002-0025472 | 4/2002 |
| KR | 719660 | 5/2007 |
| RU | 2073913 | 2/1997 |
| RU | 2112325 | 5/1998 |
| RU | 2127951 | 3/1999 |
| RU | 10929 | 8/1999 |
| RU | 2178628 | 1/2002 |
| WO | 97039548 | 10/1997 |
| WO | 98031172 | 7/1998 |
| WO | 99043136 | 8/1999 |
| WO | 00036803 | 6/2000 |
| WO | 00049793 | 8/2000 |
| WO | 00078010 | 12/2000 |
| WO | 01084868 | 11/2001 |
| WO | 02003199 | 1/2002 |
| WO | 02003732 | 1/2002 |
| WO | 02079981 | 10/2002 |
| WO | 02097620 | 12/2002 |
| WO | 03065596 | 8/2003 |
| WO | 03065743 | 8/2003 |
| WO | 04021671 | 3/2004 |

OTHER PUBLICATIONS

Sun Microsystems, "Over The Air User Initiated Provisioning Recommended Practice for the Mobile Information Device Profile," Version 1.0, May 7, 2001.

De Jong et al., "A VoD Application implemented in Java", Multimedia Tools and Applications, 5, 161–170 (1997) Kluwer Academic Publishers. Manufactured in The Netherlands.

"ETSI TS 123 057 V4.2.0 (Jun. 2001), Digital Cellular Telecommunication System (phase 2+) (GSM); Universal Mobile Telecommunications System (UMTS); Mobile Execution Environment (MExE); Functional Description Stage 2," pp. 1–84. (3GPP TS 23.057 V4.2.0 (Jun. 2001), 82 pages.

Supplementary Partial European Search Report—EP03790383, Search Authority—Munich Patent Office, Oct. 12, 2006.

Supplementary European Search Report—EP03790383, Search Authority—Munich Patent Office, Feb. 16, 2007.

International Search Report—PCT/US03/038801, International Search Authority—ISA/US, Oct. 13, 2004.

Flanagan, David, "Java in a Nutshell, A Desktop Quick Reference" Fourth Edition, O'Reilly, Mar. 2002, p. 5.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 24 and 27–29 are determined to be patentable as amended.

Claims 2–23, 25, 26 and 30–46, dependent on an amended claim, are determined to be patentable.

New claim 47 is added and determined to be patentable.

1. A wireless device, comprising:
a wireless communications interface for providing communication between said wireless device and a server over a wireless network; and
a computer platform, coupled to said wireless communications interface, and for controlling said wireless communications interface, said computer platform also for maintaining an application runtime environment for downloaded applications, said computer platform comprising a data processing circuit supporting an operating system, *an application programming interface layer configured to interface with the operating system and support an execution of a resident program on said computer platform,* and a first set of attributes;
wherein
said first set of attributes describes said application runtime environment *including said application programming interface layer of the computer platform*;
said operating system [includes] *and application programming interface layer including* a first logic to cause said computer platform to perform a comparison between said first set of attributes against a second set of attributes received from said wireless communications interface in response to an application download request for an application made by the wireless device to the server,
said second set of attributes [describes] *describing* a required runtime environment associated with the application, and
said operating system [includes] *and application programming interface layer including* a second logic to cause said computer platform to perform a block of a download of the application from the server to the wireless device if the comparison indicates that the application would not be compatible with said application runtime environment *including the application programming interface layer of the computer platform*, and to cause said computer platform to download the application if the comparison indicates that the application would be compatible with said application runtime environment.

24. A method operable on a wireless device to manage download requests for an application stored on a server over a wireless network, *the wireless device comprising a wireless communications interface and a computer platform comprising a data processing circuit supporting an operating system and an application programming interface layer that supports an execution of a resident program on said computer platform, the method* comprising:
sending a request to the server for a download of an application;
receiving a second set of attributes describing a required runtime environment associated with the application;
comparing, *at said computer platform,* said second set of attributes to a first set of attributes describing an application runtime environment supported by *at least the application programming interface layer of the computer platform of* said wireless device to determine whether the application is compatible with said application runtime environment;
blocking, *at said computer platform,* a download of the application if said comparing indicates that the application is not compatible with said application runtime environment *including the application programming interface layer of the computer platform*; and
downloading the application if said comparing indicates that the application is compatible with said application runtime environment.

27. The method of claim 24, wherein said first set of attributes comprises:
at least one attribute corresponding to a set of classes available in said *application* runtime environment.

28. The method of claim 24, wherein said first set of attributes comprises:
at least one attribute corresponding to a list of libraries available in said *application* runtime environment.

29. The method of claim 24, wherein said first set of attributes comprises:
at least one attribute corresponding to a list of libraries accessible to said *application* runtime environment.

*47. The wireless device of claim 1, wherein said first set of attributes comprises an attribute identifying processor information.*

\* \* \* \* \*